(12) United States Patent
Takahashi

(10) Patent No.: US 6,465,978 B2
(45) Date of Patent: Oct. 15, 2002

(54) DYNAMIC MOTOR DRIVE TORQUE CONTROL BASED ON POWER SWITCHING DEVICE TEMPERATURE FEEDBACK

(75) Inventor: Toshio Takahashi, Rancho Palos Verdes, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 09/875,969

(22) Filed: Jun. 8, 2001

(65) Prior Publication Data

US 2002/0063542 A1 May 30, 2002

Related U.S. Application Data

(60) Provisional application No. 60/210,476, filed on Jun. 9, 2000.

(51) Int. Cl.$^7$ ................................................ H02P 7/00
(52) U.S. Cl. ........................ 318/432; 318/434; 318/802; 318/783; 388/934
(58) Field of Search ................................ 318/432, 434, 318/802, 783; 388/934

(56) References Cited

U.S. PATENT DOCUMENTS 3,950,961 A * 4/1976 Lotz ............................ 318/432
5,750,961 A * 5/1998 Schug et al. ................ 219/497

* cited by examiner

*Primary Examiner*—Karen Masih
(74) *Attorney, Agent, or Firm*—Ostrolenk, Faber, Gerb & Soffen, LLP

(57) ABSTRACT

A circuit and method for permitting uninterrupted operation of a motor, even in the event of an over temperature condition, by dynamically controlling the motor torque based on the temperature of switching devices in the motor controller circuit. The circuit limits the torque current to either a fixed limit value if the temperature of the switching devices (or a current feedback signal for estimating the temperature of the switching devices) is below a predetermined value, or to a variable limit value which is inversely proportional to the temperature signal if the temperature of the switching devices (or the current feedback signal) exceeds the predetermined value. Accordingly, in the event of an over temperature condition, the motor continues to operate, but at a reduced torque, allowing the switching devices to cool.

6 Claims, 3 Drawing Sheets

DYNAMIC MOTOR DRIVE TORQUE CONTROL BASED ON POWER SWITCHING DEVICE TEMPERATURE FEEDBACK

This application claims the benefit of U.S. Provisional Application No. 60/210,476, filed Jun. 9, 2000.

BACKGROUND OF THE INVENTION

Traditional motor drive systems often incorporate motor current control and associated torque control. The primary purpose of controlling motor current is to indirectly or directly control the motor torque generated on the rotating shaft of the motor.

FIG. 1 shows a conventional AC motor drive system 2 with closed loop current control. Such a system typically includes a motor controller circuit 4 provided with current sense resistors 6 in the motor drive current lines as well as temperature sensors Tj associated with each IGBT of the inverter. The feedback signals from the current sense resistors 6 and the temperature sensors Tj, together with a torque producing current reference signal Iq*, are input to a current control drive system 8, which includes the conventional components shown in FIG. 1. Based on these inputs, current control drive system 8 produces an appropriate PWM signal to the IGBT gate drive to control the torque of the motor.

Typically, in the event of motor drive fault due to a switching device overtemperature condition, the current control system 8 is designed to automatically shut down the entire motor drive system 2. Complete shutdown protects the motor drive system 2 from catastrophe. However, unexpected shutdown of the entire system is undesirable, disruptive and costly since it involves shutting down not only the motor drive inverter but also coordinating the shutdown of associated machinery.

SUMMARY OF THE INVENTION

The present invention advantageously allows the motor drive system to continue operation and avoid an undesirable shutdown of the motor in the event of an overheating condition of the switching devices, e.g., IGBTs, of the inverter. Thus, for example, in a CNC milling machine application, the cutting operation can continue with reduced torque, which allows the switching device temperature to fall to an acceptable level, at which point full torque cutting can be resumed.

The present invention permits uninterrupted operation of a motor, even in the event of an over temperature condition, by dynamically controlling the torque of a motor based on the temperature of switching devices in the motor controller circuit. The circuit of the present invention generates a torque producing signal representative of the difference between the actual torque current and the desired torque current. The circuit limits this torque producing signal to either a fixed limit value if the temperature of the switching devices is below a predetermined value, or to a variable limit value, which is inversely proportional to the temperature signal, if the temperature of the switching devices exceeds the predetermined value. Accordingly, in the event of an over temperature condition, the motor continues to operate, but at a reduced torque, allowing the switching devices to cool.

Other features and advantages of the present invention will become apparent when the following description is read in conjunction with the accompanying drawings.

DETAILED DESCRIPTION OF THE PREFERRED EMBODIMENT

Figure 1:
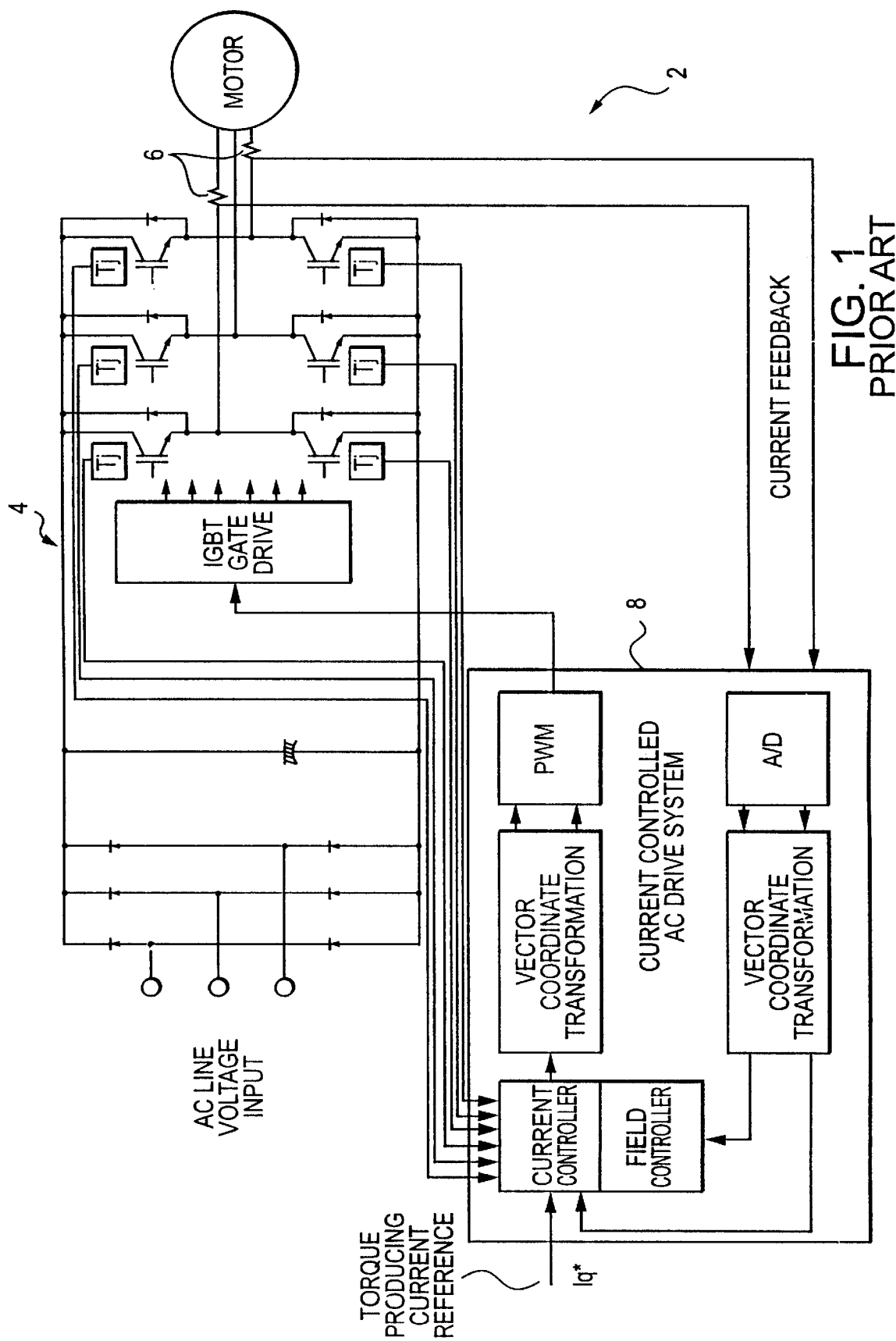
FIG. 1 shows a block diagram of a typical AC motor drive system with closed loop current control.
Figure 2:
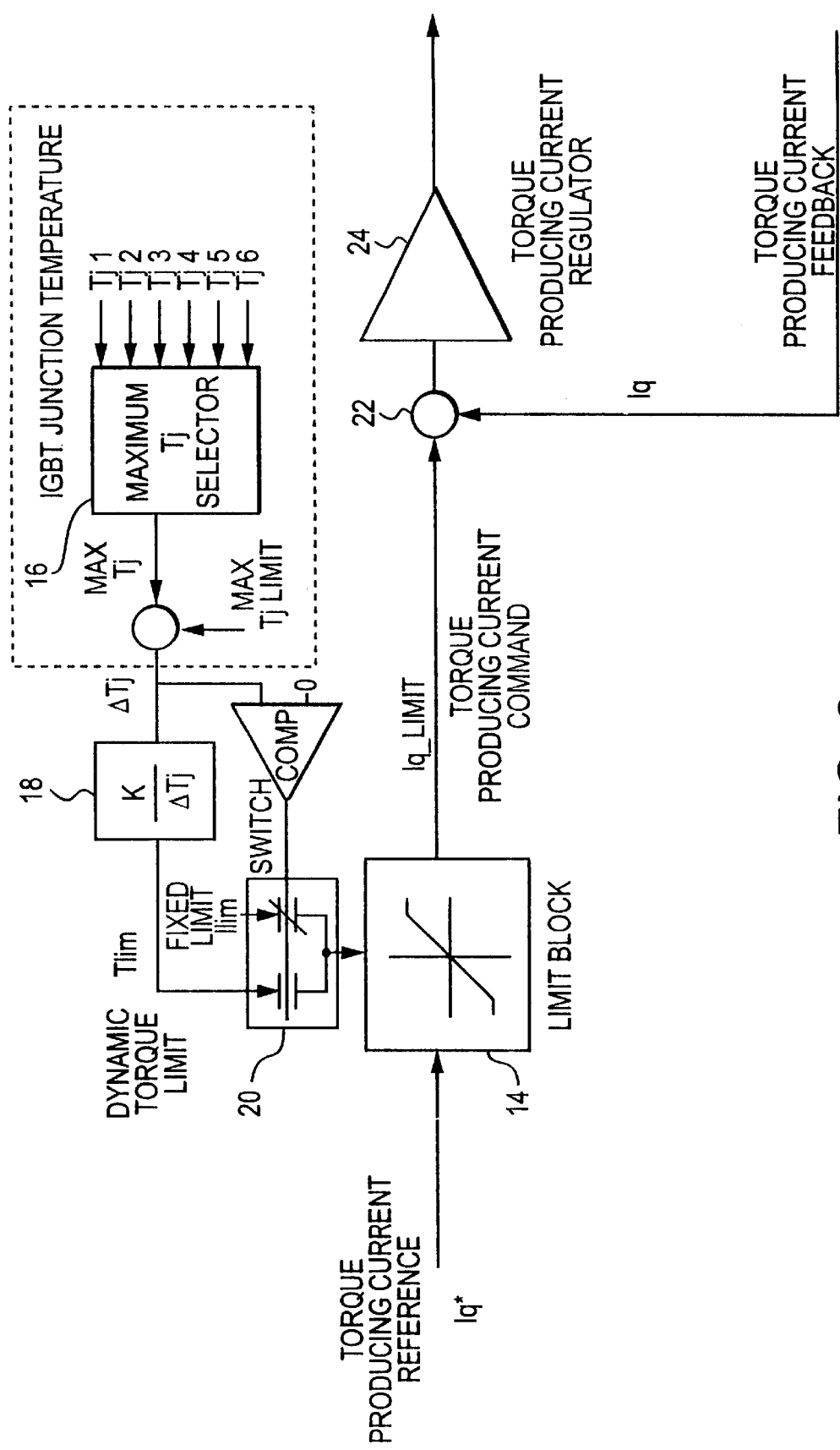
FIG. 2 is the detailed block diagram of the current controller with the torque control fear of the present invention.

Referring to FIG. 2, a preferred embodiment of the torque current controller 10 of the present invention is shown. It should be understood that the circuit of the present invention can be readily implemented by those of ordinary skill in the art with either analog circuitry or with digital circuitry using a software-based microcontroller or a digital signal processor (DSP).

In the embodiment of FIG. 2, a torque producing current reference signal Iq* is input to a current limit block 14 which limits the torque producing current within the desired limit range. This range limit is normally fixed ("Ilim" indicated in FIG. 2) whenever the measured junction temperature Tj is less than the warning level. However, in the present invention, the torque limit becomes variable ("Tlim" indicated in FIG. 2) when the measured junction temperature Tj exceeds a predefined limit ("Max Tj limit".

As shown in FIG. 2, the junction temperature feedback information can be derived from a multiple number of feedback signals (Tj1, Tj2, . . . ), i.e., one feedback signal from each IGBT, with the maximum value among these temperature feedback signals being extracted by selector 16.

The variable torque limit Tlim depends on the amount by which the junction temperature of the switching devices, i.e., the IGBTs, exceeds a predetermined value. Junction temperature (Max Tj) is constantly monitored and fed back to the current controller, and compared against the warning level temperature (Max Tj Limit), which is predefined by the system (e.g., 125° C.). When junction temperature Max Tj exceeds the predefined limit, the excess amount of the junction temperature Δ Tj is fed to the divider block 18 to generate a reverse proportional value (Tlim =K/Δ Tj, where K is a constant). This value, the dynamic torque limit, and is inputted to limit block 14 through the switch block 20, which switches the limit from fixed value Vlim to the variable limit value Tlim whenever the Max Tj exceeds the predetermined limit. The dynamic limit value, having a reverse proportional value, serves to reduce the torque producing current as the switching device junction temperature increases. In this manner, the current flowing into each overheated switching devices is reduced, so that the AC motor drive system can sustain the operation without interruption.

The output of limit block 14 is the torque producing current command lq_limit. This limit signal Iq_limit is combined with the torque producing current feedback signal Iq from the motor controller at node 22. The resulting difference signal is amplified by a torque producing current regulator 24, which, for example, may be implemented by a Proportional plus Integral (PI amplifier). The output of amplifier 24 is fed to the motor.

Figure 3:
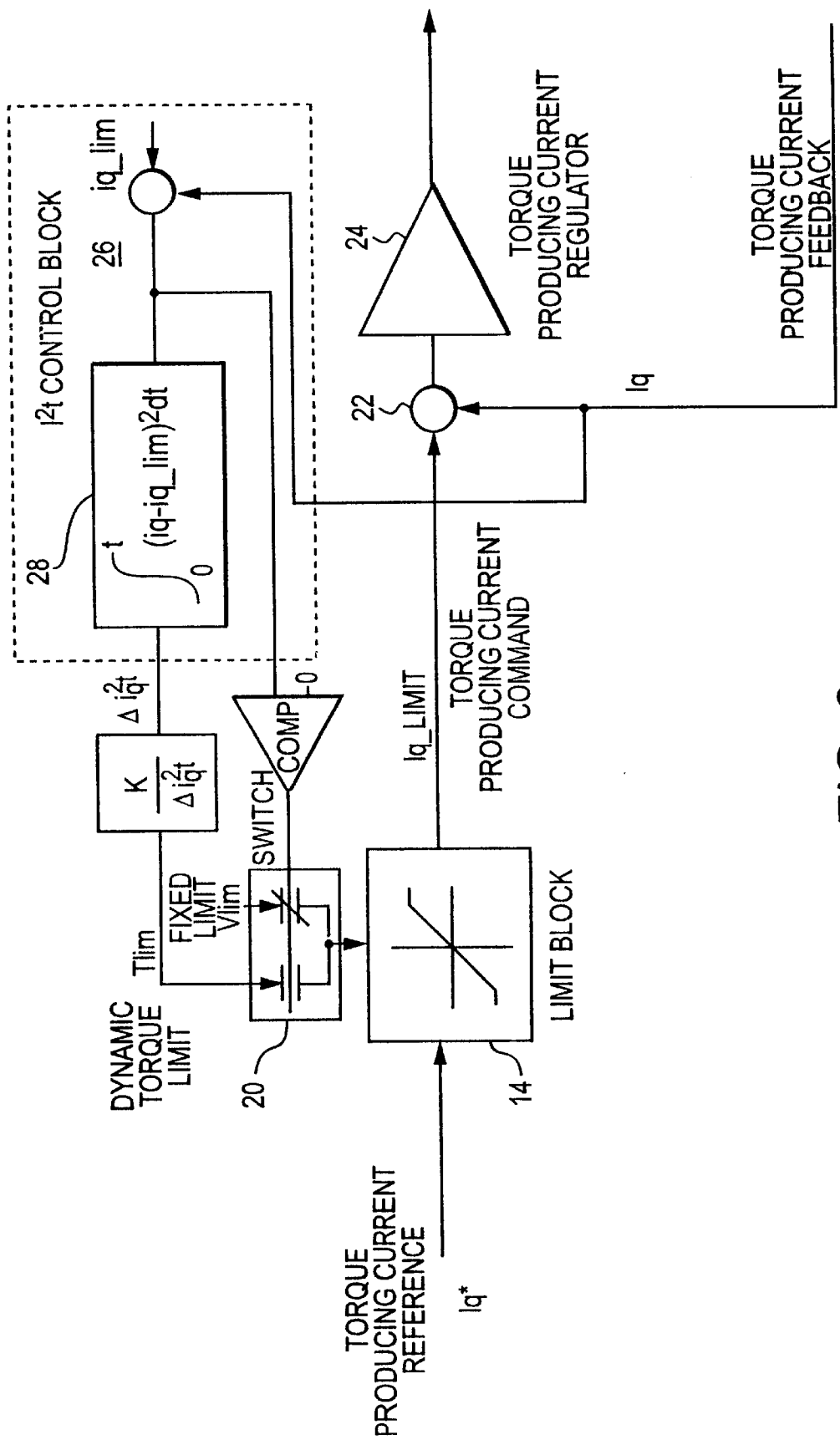
FIG. 3 is a block diagram of the use of the torque current limit circuitry shown in FIG. 2 to perform a similar function using torque producing current feedback information instead of junction temperature information.

Referring to FIG. 3, the torque current limit control circuitry shown in FIG. 2 can be used to perform a similar function using the torque producing current feedback information instead of junction temperature information. As shown in FIG. 3, an input block 26 receives the torque producing feedback current Iq and subtracts a predetermined torque current limit value Iq_lim. An $I^2t$ function, carried out by integrating the square of the current difference in integrate block 28, is performed to provide an estimate of either the switching device temperature or the rise in motor temperature. As before, a dynamic torque or fixed torque limit is applied to produce the Iq_limit torque producing current command from the torque producing current reference Iq* using either a dynamic or fixed torque limit depending on whether the torque producing current feedback exceeds the predefined limit Iq_lim.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A circuit for dynamically controlling the torque of a motor based on the temperature of switching devices in a motor controller circuit, comprising circuitry for receiving a temperature signal indicating the temperature of at least one of the switching devices and generating a torque limit signal based on the temperature signal, wherein the torque limit signal is:
   (i) a fixed limit value if the temperature signal is below a predetermined value, and
   (ii) a variable limit value inversely proportional to the temperature signal if the temperature signal exceeds the predetermined value.

2. The circuit of claim 1, further comprising:
   a selector for selecting the maximum of a plurality of temperature signals; and
   a comparator for comparing the maximum temperature signal to a predetermined limit to generate a signal representative of the difference value by which the maximum temperature signal exceeds the predetermined limit.

3. The circuit of claim 2, further comprising a switch for inputting to the limit block either the fixed limit value if the temperature difference value does not exceed zero or inputting to the limit block the variable limit signal if the temperature difference value is greater than zero.

4. A method for dynamically controlling the torque of a motor based on the temperature of switching devices in a motor controller circuit, comprising the steps of:
   receiving a temperature signal indicating the temperature of at least one of the switching devices; and
   generating a torque limit signal based on the temperature signal, wherein the torque limit signal is:
   (i) a fixed limit value if the temperature signal is below a predetermined value, and
   (ii) a variable limit value inversely proportional to the temperature signal if the temperature signal exceeds the predetermined value.

5. The method of claim 4, wherein the temperature of the switching devices is determined by a maximum temperature signal which is generated by:
   selecting the maximum of a plurality of temperature signals corresponding to the temperatures of the switching devices; and
   comparing the maximum temperature signal to a predetermined value to generate a temperature difference value indicating whether the temperature of the switching devices is above or below the predetermined value.

6. A circuit for dynamically controlling the torque of a motor based on torque producing current feedback information from a motor controller circuit, comprising:
   circuitry for receiving the torque producing current feedback information and subtracting therefrom a predetermined current limit value to obtain a current difference signal;
   circuitry for performing an integrating function on the current difference signal;
   circuitry for generating a torque limit signal, wherein the torque limit signal is:
   (i) a fixed limit value if the torque producing current feedback signal is less than the predetermined current limit value, and
   (ii) a variable limit value inversely proportional to the current difference signal if the current difference signal exceeds the predetermined current limit value.

* * * * *